No. 869,507. PATENTED OCT. 29, 1907.
A. J. McALLISTER.
DRILL CHUCK.
APPLICATION FILED OCT. 3, 1906.
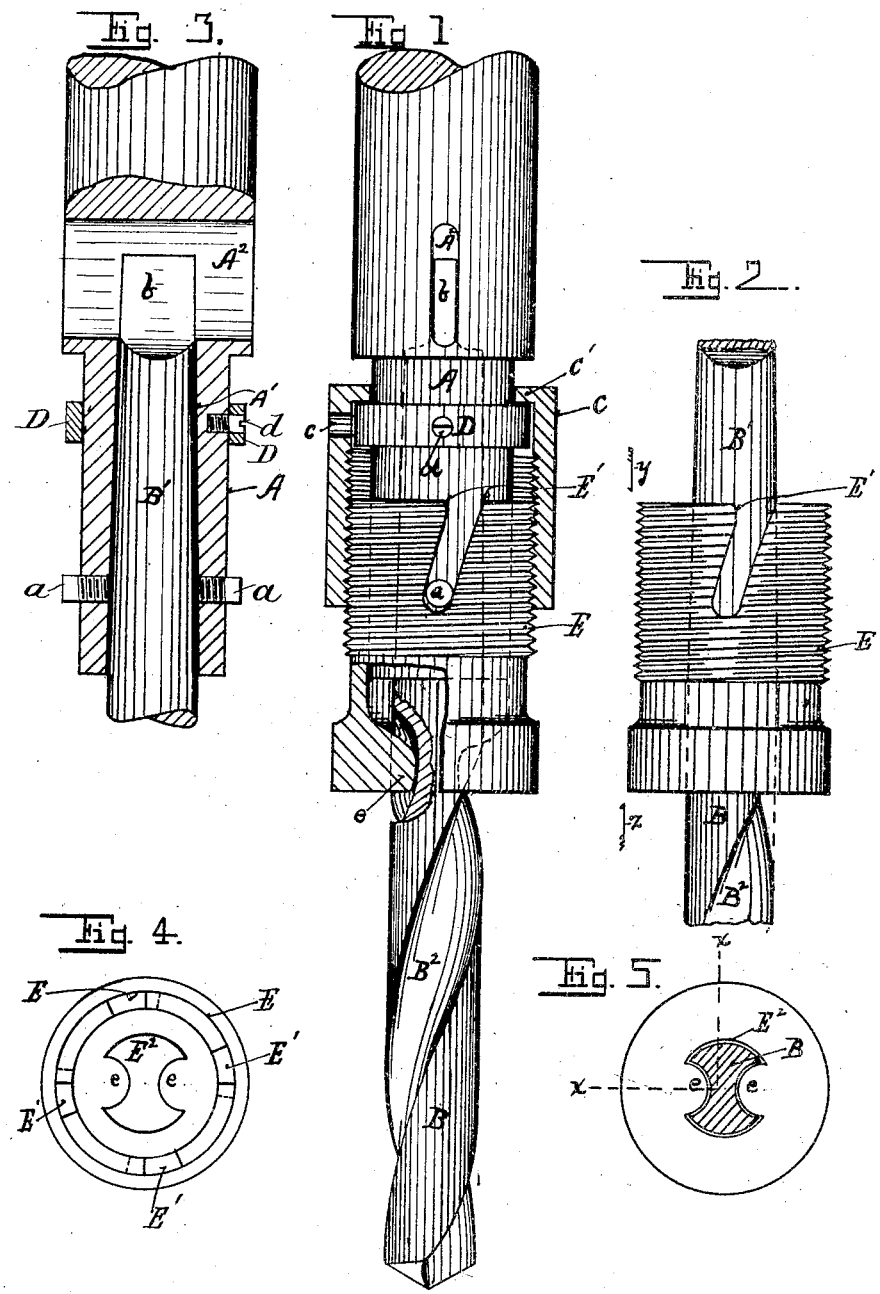

UNITED STATES PATENT OFFICE.

ALEXANDER J. McALLISTER, OF ERIE, PENNSYLVANIA.

DRILL-CHUCK.

No. 869,507.   Specification of Letters Patent.   Patented Oct. 29, 1907.

Application filed October 3, 1906. Serial No. 337,371.

*To all whom it may concern:*

Be it known that I, ALEXANDER J. MCALLISTER, a citizen of the United States, residing at Erie, in the county of Erie and State of Pennsylvania, have invented certain new and useful Improvements in Drill-Chucks; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to chuck mechanism for drill collets, and has for its object the construction of mechanism which may be attached to an ordinary drill collet in such a manner as to grasp the drill below the collet at the strongest point thereof and prevent the turning of the drill in the collet.

The features of my invention and objects accomplished thereby are hereinafter set forth and explained, and are illustrated in the accompanying drawings in which:

Figure 1 is a view in elevation of my improved chuck mechanism with parts thereof in section, the drill holding portion and drill being broken out, in section, substantially on the line $x$—$x$ in Fig. 5. Fig. 2 is a side view in elevation of a drill inserted in the drill holding portion of my device. Fig. 3 is a central section of a drill collet with the shank of a drill therein, showing the manner of securing the ring D and studs $a$ $a$ thereto. Fig. 4 is a top or plan view of the drill holding portion of my device looking in the direction of the arrow $y$ in Fig. 2. Fig. 5 is a plan view of the lower end of the drill holding portion of my device looking in the direction of the arrow $z$ in Fig. 2.

In these drawings A indicates the usual drill collet or stem of an ordinary power drill press. A' (see Fig. 3) indicates a tapered longitudinal opening or socket in the lower end thereof adapted to receive the tapered shank B' of the drill B. $A^2$ indicates a transverse slot in said collet intercepting and communicating with the tapered socket A', into which slot $A^2$ the tang or flattened upper end $b$ of the drill shank B' enters to prevent the drill from turning in the collet A. These parts A, A', $A^2$, B, B', and $b$, are of usual and ordinary construction.

In the general use of drill collets great difficulty is experienced by reason of the twisting off of the tang $b$, as shown in Fig. 2, while the balance of the drill B is still good, thereby allowing the drill to turn in the collet A, and rendering the drill valueless. In shops employing drill presses there may be found varying numbers of drills from which the tangs have been twisted, and it is to overcome this difficulty of twisting off the tangs, and to utilize drills without tangs that is the object of my invention. To attain this object I provide an internally screw-threaded sleeve C having an inwardly projecting annular shoulder C' at its upper end, which shoulder C' fits loosely around the drill collet A. To retain this sleeve C upon the drill collet A, I secure a ring D upon the collet A by means of one or more set-screws $d$, which I insert through an opening $c$ in the side of the sleeve C. Near the lower end of the collet A I secure thereto one or more studs $a$ for the purpose hereinafter set forth. Upon the collet A I then place an externally screw threaded sleeve E, the threads on which are adapted to fit and engage the internal threads in the sleeve C. This sleeve E is also provided with one or more slots E' adapted to receive the stud or studs $a$ on the collet A. The lower end of the longitudinal opening in the sleeve E is contracted to a diameter equal to the diameter of the drill to be used therewith. This contracted opening $E^2$ (see Figs. 4 & 5) has one or more projections $e$ adapted to enter the groove or grooves $B^2$ in the sides of the drill B as shown in Figs. 1 & 5. It is obvious that the sleeve E will rotate around the drill by means of the projections $e$ following the grooves $B^2$ in the sides thereof, and that therefore when the tang $b$ is on the upper end of the drill shank it is preferable to make the slots E' substantially continuations of the grooves in the drill, so that as the sleeve E and drill B are drawn upward by the action of the screw threads the sleeve E, can rotate sufficiently to follow the grooves in the drill. However this is only necessary when the drill is provided with a tang $b$, as otherwise the drill can turn in the collet sufficiently to permit the sleeve E to be drawn up far enough to force the drill shank into the tapered socket in the collet.

In operation the drill B is put down through the opening $E^2$ in the sleeve E as shown in Fig. 2. The drill shank is then inserted into the tapered socket in the collet, and the sleeve E placed around the collet with one or more of the slots E' engaging the stud or studs $a$ on the collet A. The sleeve C is then turned until the sleeve E and drill therein are drawn up and firmly held in place. Power is then applied to rotate the collet which, through the stud $a$, causes the sleeve E and drill to rotate. It is obvious from the foregoing description that with my device the power necessary to drive the drill is exerted thereupon at a point below the shank of the drill, and that therefore there is no danger of twisting off the tang $b$, and also that drills without tangs can be used therewith in ordinary collets.

Having thus fully described my invention so as to enable others to construct and operate the same, what I claim as new and desire to secure by Letters-Patent of the United States is:

1. The combination in a drill chuck, of a drill collet, a sleeve having openings in the wall thereof, adapted to embrace the lower end of said collet and engage the grooves in a drill, and one or more studs in said collet passing through the openings in said sleeve, substantially as set forth.

2. The combination in a drill-chuck, of a drill collet, one or more studs in said drill-collet, a longitudinally slotted sleeve adapted to engage the grooves in a drill and the studs on said collet, and means for retaining said sleeve in place on said collet, substantially as and for the purpose set forth.

3. The combination in a drill chuck of a drill collet having a tapered socket therein, an internally screw threaded sleeve loosely secured upon said collect, one or more studs on said collet, an externally screw-threaded sleeve having slots in the walls thereof adapted to receive said studs and having a contracted opening in the lower end thereof, and one or more internal projections or studs in said opening adapted to enter the grooves in a drill, substantially as and for the purpose set forth.

In testimony whereof I affix my signautre, in presence of two witnesses.

ALEXANDER J. McALLISTER.

Witnesses:
H. M. STURGEON,
P. V. GIFFORD.